(12) United States Patent
Nakamura et al.

(10) Patent No.: US 7,472,188 B2
(45) Date of Patent: Dec. 30, 2008

(54) METHOD AND APPARATUS FOR PROVIDING MONITORING-INFORMATION, AND COMPUTER PRODUCT

(75) Inventors: Motohisa Nakamura, Kawasaki (JP); Takayuki Maehara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 817 days.

(21) Appl. No.: 11/128,396

(22) Filed: May 13, 2005

(65) Prior Publication Data

US 2006/0150029 A1    Jul. 6, 2006

(30) Foreign Application Priority Data

Jan. 6, 2005    (JP)    ............. 2005-001794

(51) Int. Cl.
  *G06F 15/173*    (2006.01)
  *G06F 11/00*    (2006.01)
(52) U.S. Cl. ...................... 709/224; 370/232
(58) Field of Classification Search ............. 709/203, 709/214, 217, 218, 219; 358/434
  See application file for complete search history.

(56) References Cited

U.S. PATENT DOCUMENTS

| | | | | |
|---|---|---|---|---|
| 5,844,545 A | * | 12/1998 | Suzuki et al. ............. | 345/156 |
| 5,850,443 A | * | 12/1998 | Van Oorschot et al. ...... | 380/285 |
| 5,880,785 A | * | 3/1999 | Fujiwara ................ | 375/240.18 |
| 5,929,916 A | * | 7/1999 | Legall et al. ............ | 375/240.05 |
| 5,940,130 A | * | 8/1999 | Nilsson et al. .......... | 375/240.12 |
| 6,009,079 A | * | 12/1999 | Boye et al. ............. | 370/242 |
| 6,285,466 B1 | * | 9/2001 | Chimura et al. .......... | 358/434 |
| 6,335,803 B1 | * | 1/2002 | Chimura et al. .......... | 358/434 |
| 6,535,906 B1 | * | 3/2003 | Barber et al. ............ | 709/200 |
| 6,721,941 B1 | * | 4/2004 | Morshed et al. .......... | 717/127 |
| 6,741,570 B1 | * | 5/2004 | Kojima ................. | 370/253 |
| 7,107,406 B2 | * | 9/2006 | Kurasugi ................ | 711/137 |
| 7,356,079 B2 | * | 4/2008 | Laksono et al. ......... | 375/240.03 |

FOREIGN PATENT DOCUMENTS

| | | |
|---|---|---|
| JP | 7-6062 | 1/1995 |
| JP | 2000-347905 | 12/2000 |
| JP | 2002-83113 | 3/2002 |

OTHER PUBLICATIONS

"ServerView 3.3", [Online], [Searched Dec. 31, 2004], Internet URL: <http://www.fmworld.net/bitz/primergy/serverview>.

* cited by examiner

*Primary Examiner*—Ario Etienne
*Assistant Examiner*—Sargon N Nano
(74) *Attorney, Agent, or Firm*—Staas & Halsey LLP (57) ABSTRACT

A storing unit includes a predetermined number of present value buffers that store the present value in time series, and a predetermined number of section-representative-value buffers that store a section representative value calculated based on the present value belonging to a predetermined section included in the monitoring period in time series. A storage control unit performs, when the present value is acquired, a control for storing data in the present value buffers and the section-representative-value buffers. A calculating unit calculates a period representative value of the monitoring period based on the present value and the section representative value stored in the storing unit.

20 Claims, 11 Drawing Sheets

FIG.2

| MONITORING OBJECT NAME | NUMBER |
|---|---|
| CPU USAGE RATIO | 32 |
| MEMORY USAGE RATIO | 1 |
| HDD (PARTITION) USAGE RATIO | 32×15 |
| NETWORK USAGE RATIO | 24 |
| NUMBER OF TIMES OF LOGIN | 1 |

METHOD AND APPARATUS FOR PROVIDING MONITORING-INFORMATION, AND COMPUTER PRODUCT

BACKGROUND OF THE INVENTION

1) Field of the Invention

The present invention relates to a technology for providing sufficient monitoring-information for a practical use efficiently while controlling a consumption of resources.

2) Description of the Related Art

Conventionally, a server apparatus and the like, which is required to operate stably, acquires an operation state, such as a central processing unit (CPU) usage ratio and a memory usage ratio, and provides a system administrator with the operation state acquired by, for example, graphically representing the operation state in time series.

For example, a technique is disclosed in Fujitsu Kabushiki Kaisha, "ServerView 3.3", [online], [searched Dec. 13, 2004]. Internet http://www.fmworld.net/bitz/primergy/serverview/, with which a server apparatus acquires an operation state of main components constituting the server apparatus and transmits the operation state to a monitoring terminal connected via a network, and the monitoring terminal monitors the operation state of the server apparatus by graphically representing the operation state received. A method of calculating a usage ratio of a CPU by adjusting fluctuation in an instantaneous usage ratio of the CPU is disclosed in, for example, Japanese Patent Application Laid-Open No. 2000-347905.

However, even with the conventional techniques, it is not easy to control consumption of resources involved in monitoring efficiently. Server apparatuses in recent years often include a large number of CPUs and a large number of storage devices. Thus, the number of components, which are monitoring objects, tends to increase. Therefore, a large storage area is consumed simply by accumulating acquired operation information.

For example, when a usage ratio of a virtual volume in a storage device is monitored at a monitoring interval of 1 second in a server apparatus, even if an amount of operation information is 1 byte for performing monitoring once, a storage area of 1000 bytes is usually required to calculate an average usage ratio in a monitoring period of 1000 seconds. Moreover, a required storage area increases in proportion to an increase in the virtual volume that is a monitoring object. Resources of the server apparatus should be used for essential job processing. If the resources are consumed for operation monitoring excessively, a stable operation is undesirably hindered.

On the other hand, in order to control consumption of the storage area of the server apparatus, it is also conceivable that the server apparatus transmits acquired operation information to a monitoring apparatus as occasion arises and the monitoring terminal calculates an average value and the like. However, this simply shifts an apparatus that consumes a storage area and does not solve the consumption of resources involved in monitoring.

Therefore, it is important to find how to realize a server apparatus that can provide monitoring information sufficient for a practical use efficiently while controlling resource consumption involved in system monitoring. The same holds true for a monitoring-information providing apparatus that acquires an operation state of a monitoring object and provides monitoring information.

SUMMARY OF THE INVENTION

It is an object of the present invention to solve at least the above problems in the conventional technology.

A monitoring-information providing apparatus according to one aspect of the present invention, which acquires a present value representing an operation state of a monitoring object for every predetermined monitoring interval to generate monitoring information for a predetermined monitoring period, and provides a monitoring terminal with the monitoring information generated, includes a storing unit including a predetermined number of present value buffers that store the present value in time series, and a predetermined number of section-representative-value buffers that store a section representative value calculated based on the present value belonging to a predetermined section included in the monitoring period in time series; a storage control unit that, when the present value is acquired, performs a control for storing data in the present value buffers and the section-representative-value buffers; and a calculating unit that calculates a period representative value of the monitoring period based on the present value and the section representative value stored in the storing unit.

A monitoring-information providing method according to another aspect of the present invention, which is for acquiring a present value representing an operation state of a monitoring object for every predetermined monitoring interval to generate monitoring information for a predetermined monitoring period, and providing a monitoring terminal with the monitoring information generated, includes storing including storing the present value in a predetermined number of present value buffers in time series, and storing a section representative value calculated based on the present value belonging to a predetermined section included in the monitoring period in a predetermined number of section-representative-value buffers in time series; performing, when the present value is acquired, a control for storing data in the present value buffers and the section-representative-value buffers; and calculating a period representative value of the monitoring period based on the present value and the section representative value stored at the storing.

A computer-readable recording medium according to still another aspect of the present invention stores a monitoring-information providing program that causes a computer to execute the above monitoring-information providing method according to the present invention.

The other objects, features, and advantages of the present invention are specifically set forth in or will become apparent from the following detailed description of the invention when read in conjunction with the accompanying drawings.

DETAILED DESCRIPTION

Exemplary embodiments of the present invention are explained in detail below with reference to the accompanying drawings. Note that the present invention is not limited by the embodiments.

Figure 1:
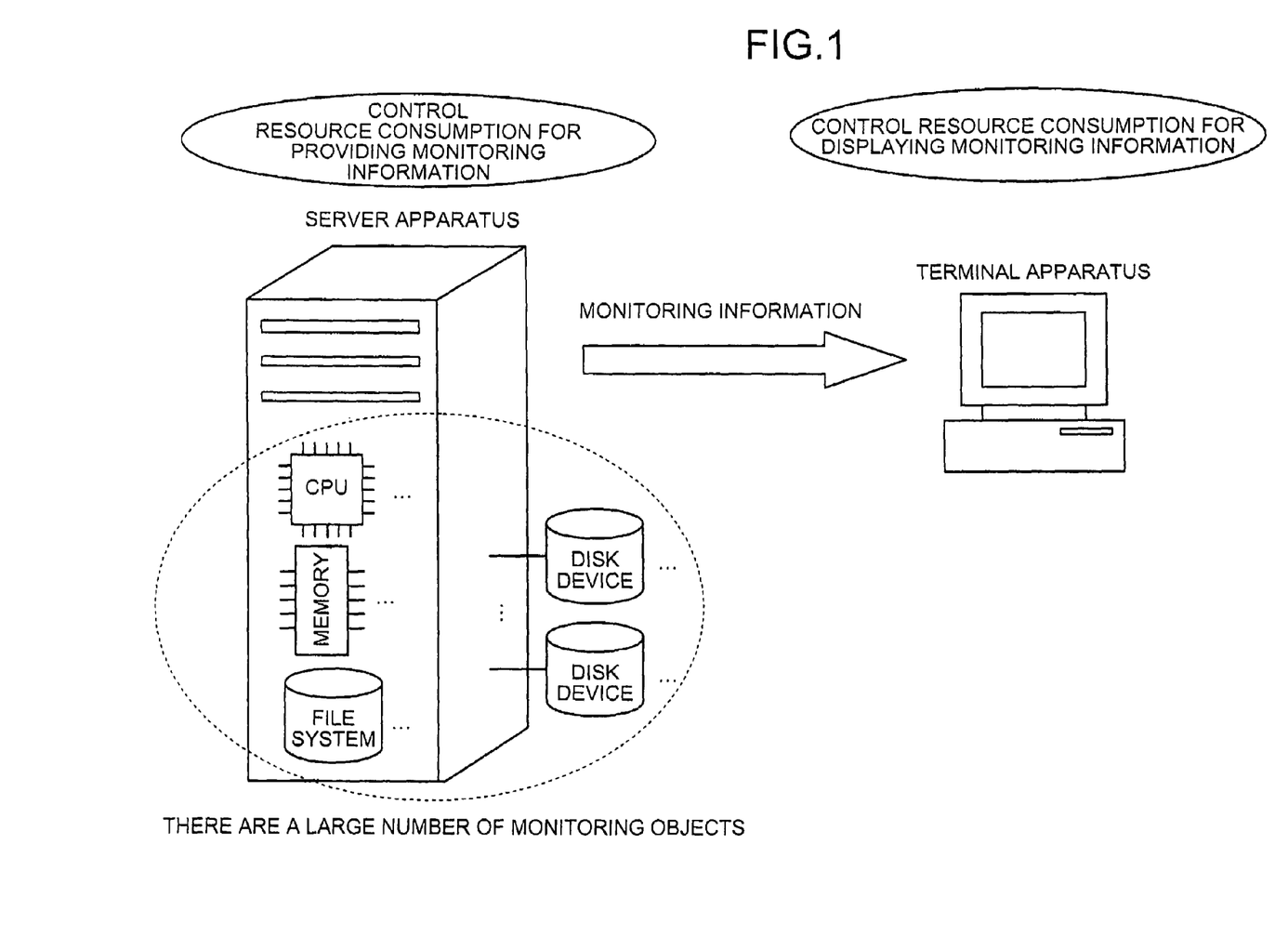
FIG. 1 is a schematic for illustrating an outline of monitoring-information providing process.

FIG. 1 is a schematic for illustrating an outline of monitoring-information providing process. It is assumed that the monitoring information providing information is performed on a server apparatus shown in the figure.

As shown in the figure, components like a CPU, a memory, a file system (a virtual volume), and a disk device (an actual volume) are included in the server apparatus on which the monitoring-information provision processing, which is a characteristic part of the present embodiment, operates. In such monitoring-information provision processing, operation states of the components are acquired periodically to create monitoring information, which is transmitted to a monitoring terminal (a terminal apparatus).

Figure 2:
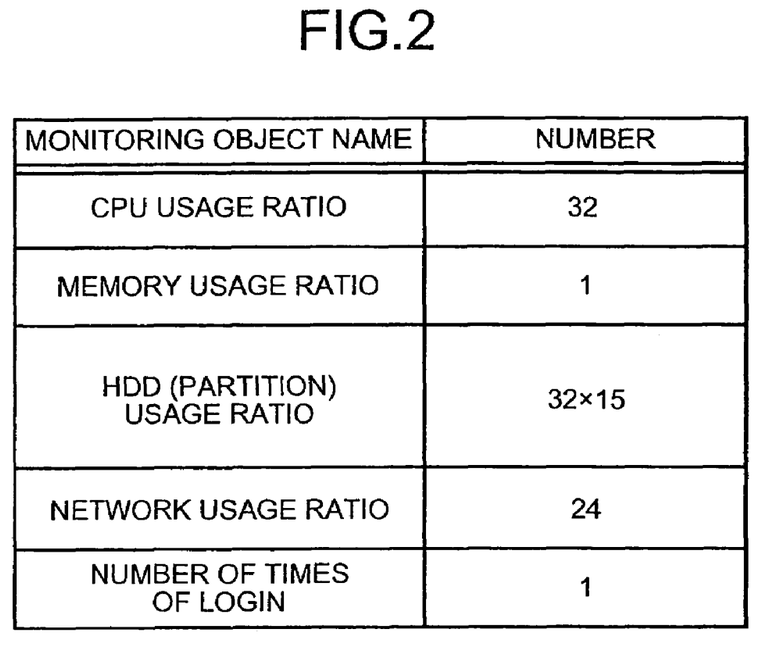
FIG. 2 is a table of an example of monitoring object components.

In server apparatuses in recent years, the number of components, which are monitoring objects, tends to increase. Thus, for stable operation of the server apparatuses, it is necessary to grasp operation abnormalities in a large number of components accurately. An example of the components, which are monitoring objects of the server apparatuses in recent years, is explained here with reference to FIG. 2. FIG. 2 is a table of an example of monitoring object components.

In a server apparatus including a large number of CPUs, it is necessary to acquire usage ratios of the respective CPUs. Thus, as shown in FIG. 2, when thirty-two CPUs are mounted, usage ratios of the thirty-two CPUs have to be set as monitoring objects. When thirty-two hard disk device (HDD) is connected and fifteen partitions are formed in the respective hard disk devices, there are 32×15 usage ratios of the partitions that are set as the monitoring objects. In this way, there are an extremely large number of monitoring object components in the server apparatus. Thus, unless a storage area for storing present values to be used is controlled for each of the monitoring objects, it is likely that an operation of the server apparatus itself is suppressed. When the number of components, which are monitoring objects, increases in this way, a problem of storage area consumption involved in monitoring becomes manifest.

Figure 3:
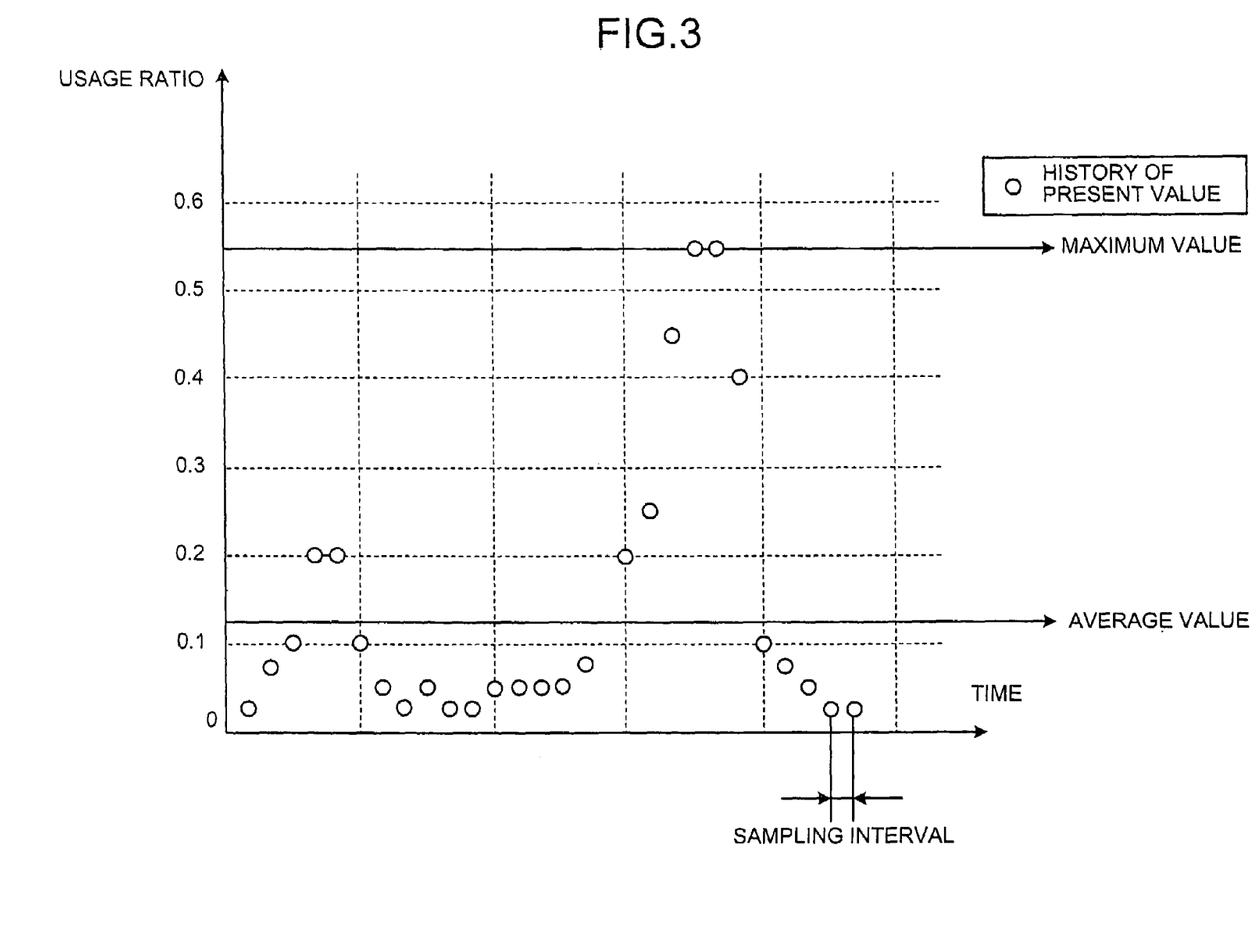
FIG. 3 is a graph of a conventional method of calculating a maximum value and an average value.

In the conventional monitoring-information provision processing, present values acquired at predetermined intervals are stored in a storage area over a monitoring period designated by a user or the like. Then, a maximum value and an average value in the monitoring period are calculated based on the stored present values. A method of calculating a maximum value and an average value in the conventional monitoring-information provision processing is explained here with reference to FIG. 3. FIG. 3 is a graph of a conventional method of calculating a maximum value and an average value.

As shown in FIG. 3, respective present values acquired at predetermined sampling intervals are indicated by "white circles". A vertical axis indicates a usage ratio of a monitoring object component and a horizontal axis indicates time. In calculating an average value of all the present values shown in the figure, it is necessary to add up usage ratios indicated by "white circles" and divide the total of the usage ratios by the number of "white circles". Thus, it is necessary to temporarily store the usage ratios indicated by "white circles".

On the other hand, when a maximum value is calculated, it is judged whether a present value acquired anew is a maximum value. When this present value is a maximum value, a stored value only has to be replaced with the present value. Thus, it is unnecessary to store all the present values shown in FIG. 3. However, when there is only one stored value, a usage ratio temporarily takes a large value such as 1.0. Then, since this value is never updated in future, it is impossible to obtain a maximum value in a nearest period.

As described above, in the conventional method of calculating an average value, the longer the monitoring period, the more storage area is consumed. Even if a moving average of present values is calculated, it is necessary to store a large number of present values if a monitoring period is long. Thus, the problem of storage area consumption is not solved. In addition, in the conventional method of calculating a maximum value, again, it is necessary to store plural present values as in the case of the average value calculation if it is attempted to obtain a maximum value in a nearest period.

In order to control resource consumption of a server apparatus, it is also possible that the server apparatus does not store an acquired present value but transmits a present value to a monitoring terminal (a terminal apparatus) every time the server apparatus acquires a present value. However, in this method, a resource consuming apparatus is shifted from the monitoring apparatus to the monitoring terminal (the terminal apparatus). Thus, the method does not solve the problem of resource consumption involved in monitoring fundamentally.

Thus, in the monitoring-information provision processing that is the characteristic part of the present embodiment, a section representative value (a maximum value, an average value, etc.) based on present values is used appropriately in calculation processing for a maximum value and an average value in a designated monitoring period. A mechanism, which can control consumption of a storage area by reducing the number of present values required to be stored temporarily and provide a maximum value and an average value sufficient for practical uses, is provided.

Further, the calculated maximum value and the calculated average value are graphically represented using the Markup language and transmitted to the monitoring terminal (the terminal apparatus). Thus, it is unnecessary to store monitoring information on the terminal apparatus side either. Therefore, it is possible to control resource consumption on the terminal apparatus side efficiently.

Figure 4:
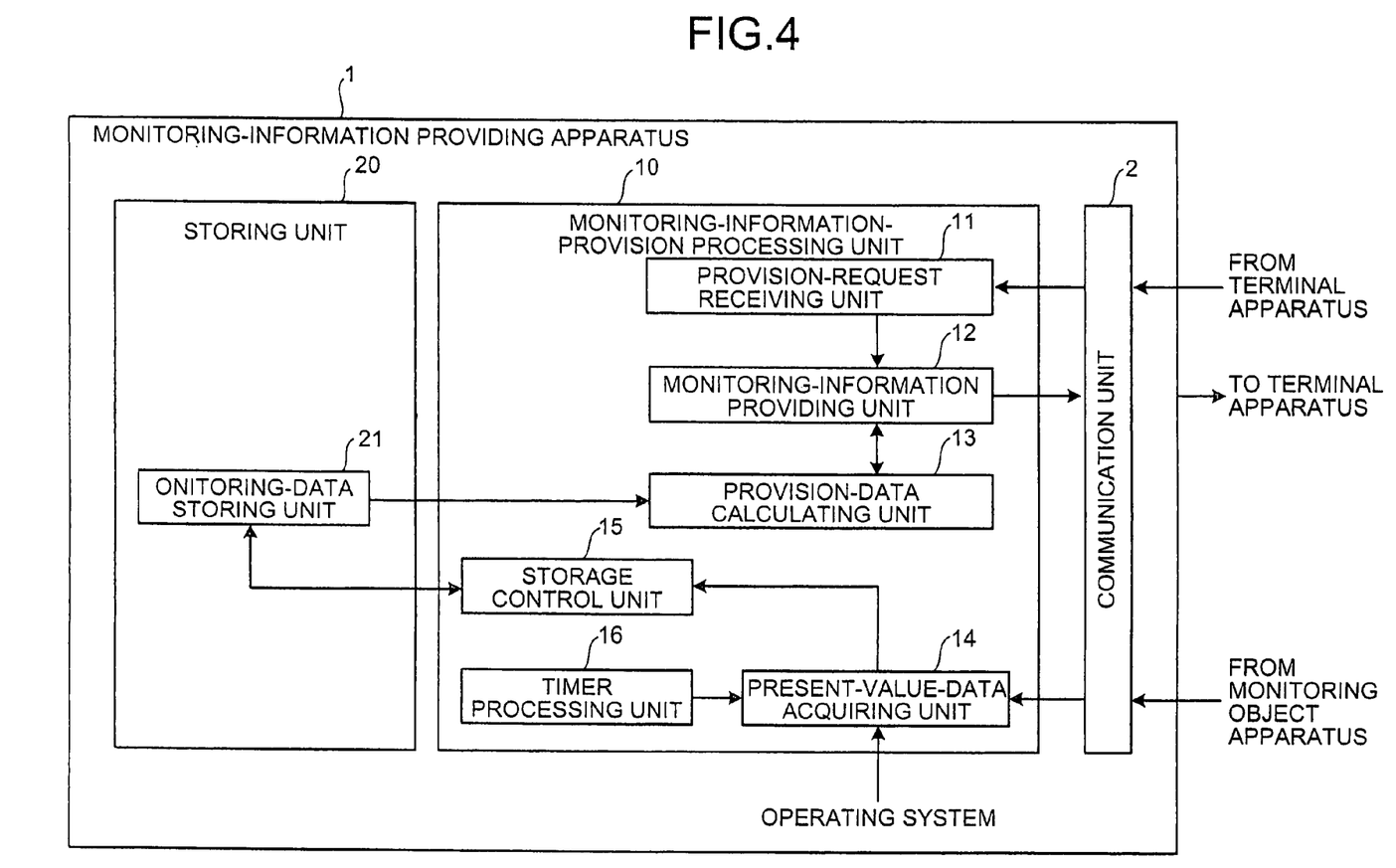
FIG. 4 is a block diagram of a structure of a monitoring-information providing apparatus.

FIG. 4 is a block diagram of a structure of a monitoring-information providing apparatus 1. As shown in the figure, the monitoring-information providing apparatus 1 includes a communication unit 2, a monitoring-information provision processing unit 10, and a storing unit 20.

The monitoring-information provision processing unit 10 includes a provision-request receiving unit 11, a monitoring-information providing unit 12, a provision-data calculating unit 13, a present-value-data acquiring unit 14, a storage control unit 15, and a timer processing unit 16. The storing unit 20 includes a monitoring-data storing unit 21.

The communication unit 2 is constituted by a communication device like a local area network (LAN) board and a wide area network (WAN) board. The communication unit 2 communicates with a terminal apparatus serving as a monitoring terminal and a monitoring object apparatus to exchange data with the monitoring-information provision processing unit 10. For example, when the communication unit 2 receives a provision request for monitoring information from the terminal apparatus, the communication unit 12 passes this provision request to the provision-request receiving unit 11 of the monitoring-information provision processing unit 10. When the communication unit 2 receives monitoring information from the monitoring-information providing unit 12, the communication unit 2 transmits this monitoring information to the terminal apparatus. In addition, when the communication unit 2 receives present value data representing an operation state from the monitoring object apparatus, the communication unit 2 passes this data to the present-value-data acquiring unit 14.

The monitoring-information provision processing unit 10 is a processing unit that is a characteristic part of the present embodiment. Specifically, the monitoring-information provision processing unit 10 receives present value data representing an operation state of a monitoring object from an operating system of the monitoring-information providing apparatus 1 and an external monitoring object apparatus and temporarily stores the data in the storing unit 20. In response to a request from the terminal apparatus serving as the monitoring terminal, the monitoring-information provision processing unit 10 graphically represents a history, an average value, a maximum value, and the like of the present value data, which represents the operation state of the monitoring object, using the Markup language and provides the terminal apparatus with the history, the average value, the maximum value, and the like.

The provision-request receiving unit 11 receives a monitoring-information provision request message from the terminal apparatus serving as the monitoring terminal via the communication unit 2 and notifies the monitoring-information providing unit 12 that the provision request has been received. This monitoring-information provision request message is a message that is transmitted to the monitoring-information providing apparatus according to operation of the terminal apparatus by a system administrator or processing based on a definition file designated in advance. For example, such a monitoring-information provision request message includes a monitoring object name, a monitoring period, and a provision format.

When it is notified from the provision-request receiving unit 11 that the provision request has been received, the monitoring-information providing unit 12 requests the provision-data calculating unit 13 to calculate provision data. When the monitoring-information providing unit 12 receives a result of the calculation, the monitoring-information providing unit 12 also graphically represents the calculation result using the Markup language such as hyper text Markup language (HTML) or an extensible Markup language (XML) and transmits the calculation result to the terminal apparatus, which requests the provision of monitoring information, via the communication unit 2.

For example, when the monitoring-information providing unit 12 is requested to provide an average value in 100 seconds and a history in 100 seconds for a CPU usage ratio from the terminal apparatus, the monitoring-information providing unit 12 requests the provision-data calculating unit 13 to provide such contents. When 100 seconds has elapsed, if the monitoring-information providing unit 12 receives corresponding data from the provision-data calculating unit 13, the monitoring-information providing unit 12 graphically represents the history and the average value of the CPU usage ratio using the Markup language and transmits the history and the average value to the terminal apparatus.

Note that, in the explanation of the present embodiment, the monitoring-information providing unit 12 graphically represents monitoring information using the Markup language and transmits the monitoring information to the terminal apparatus. However, the monitoring-information providing unit 12 may graphically represent the monitoring information by arranging characters like "*" instead of using the Markup language. Even if the Markup language is used, the monitoring-information providing unit 12 may include a value, which the monitoring-information providing unit 12 provides, in the Markup language keeping a form of numerical value data.

The provision-data calculating unit 13 calculates an average value and a maximum value from present value data and section representative value data stored in the monitoring-data storing unit 21 of the storing unit 20 in response to a request from the monitoring-information providing unit 12. In addition, the provision-data calculating unit 13 returns the calculated average value and the calculated maximum value to the monitoring-information providing unit 12 together with the data stored in the monitoring-data storing unit 21.

Figure 5:
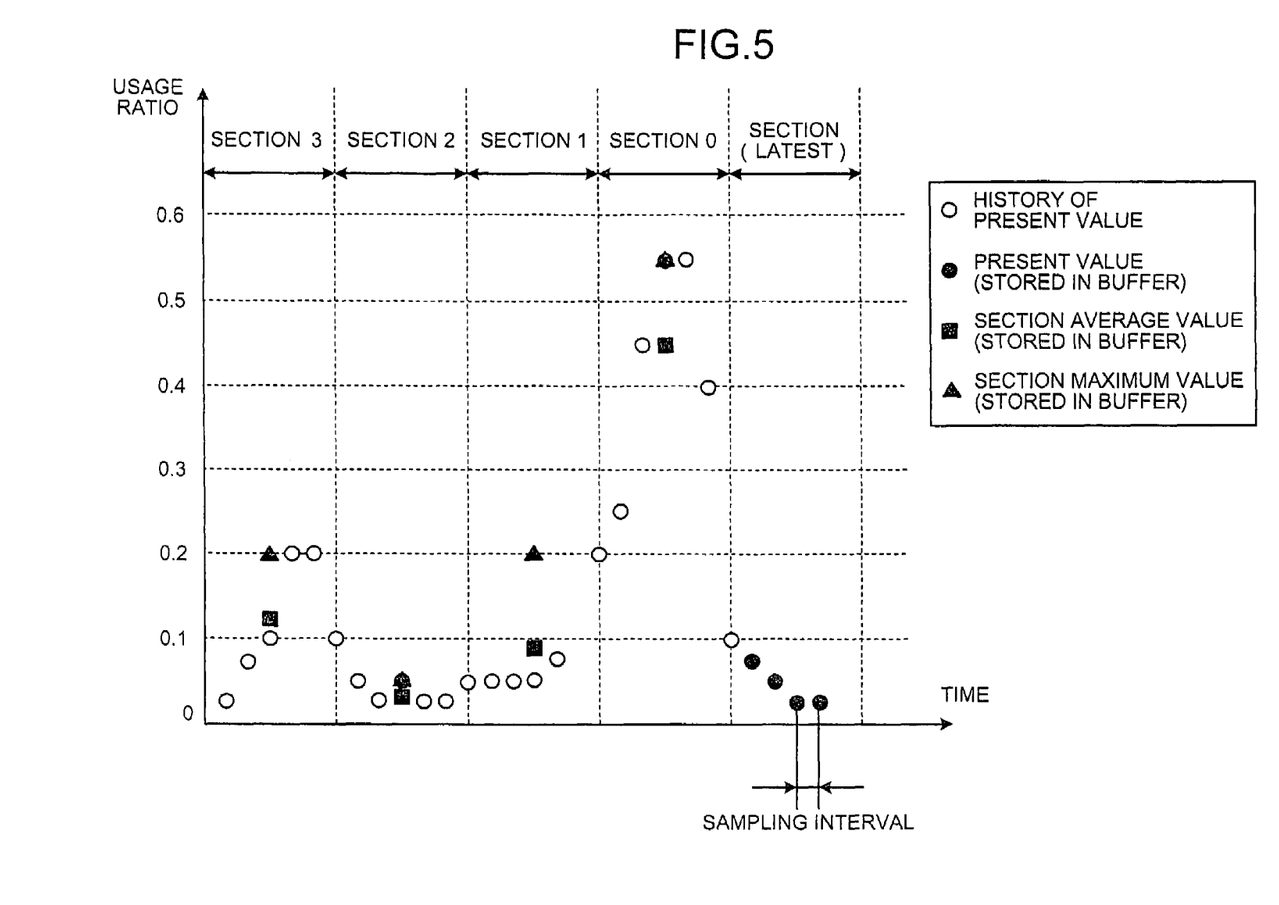
FIG. 5 is a graph for illustrating an outline of processing for calculating an average value and a maximum value.

FIG. 5 is a graph for illustrating an outline of processing for calculating an average value and a maximum value. In the monitoring-information provision processing that is a characteristic part of the present embodiment, a concept of "section" is introduced to calculate an average value and a maximum value for each section of acquired present values. In sections other than a latest section, only the calculated "average value and maximum value for each section" are stored in the storing unit 20. Consequently, resource consumption is controlled.

"White circles" in FIG. 5 represent a history of acquired present values, which corresponds to the data stored in the storage area in the conventional monitoring-information provision processing. In the monitoring-information provision processing in the present embodiment, present values are stored only in a latest section (indicated by "black circles" in FIG. 5). When all "present value buffers" for storing the present values in this latest section are filled, section average values (indicated by "black squares" in FIG. 5) and section maximum values (indicated by "black triangles" in FIG. 5) of the present values are calculated and stored in "representative value buffers" for storing section representative values and the present value buffers are cleared.

Therefore, in the case shown in FIG. 5, six present values belonging to one section are replaced with one average value and one maximum value, which are stored in the storing unit 20. Thus, it is possible to reduce the storage area to one third of the conventional storage area. Note that a length of one section can be set to an arbitrary length. Thus, it is possible to reduce the storage area to one hundredths of the conventional storage area if a section length is set such that two hundred present values are included in one section.

When the plural present values are replaced with section representative values in this way to calculate a representative value over the entire monitoring period, calculation accuracy falls compared with calculation for calculating a representative value over the entire monitoring period based on all the present values. However, when operation states such as a CPU usage ratio and a memory usage ratio are monitored, only accuracy allowing an administrator to survey operation states in the past is often required. It is often required to improve accuracy of data acquired in a nearest period rather than accuracy of data in the past. In other words, it is easy to predict operation abnormality in the future if it is possible to compare an outline of a transition of the data in the past and a transition of the data acquired in the nearest period. Therefore, an advantage of resource consumption (storage area consumption) control overwhelms a disadvantage due to deterioration in data accuracy, no problem is caused even if the plural present values are replaced with section representative values.

Referring back to FIG. 4, the present-value-data acquiring unit 14 is explained. The present-value-data acquiring unit 14 periodically acquires present value data of monitoring object components such as a CPU usage ratio and a memory usage ratio from the operating system or the like with a notice from the timer processing unit 16 as a trigger. The present-value-data acquiring unit 14 passes the acquired present value data to the storage control unit 15.

Figure 6:
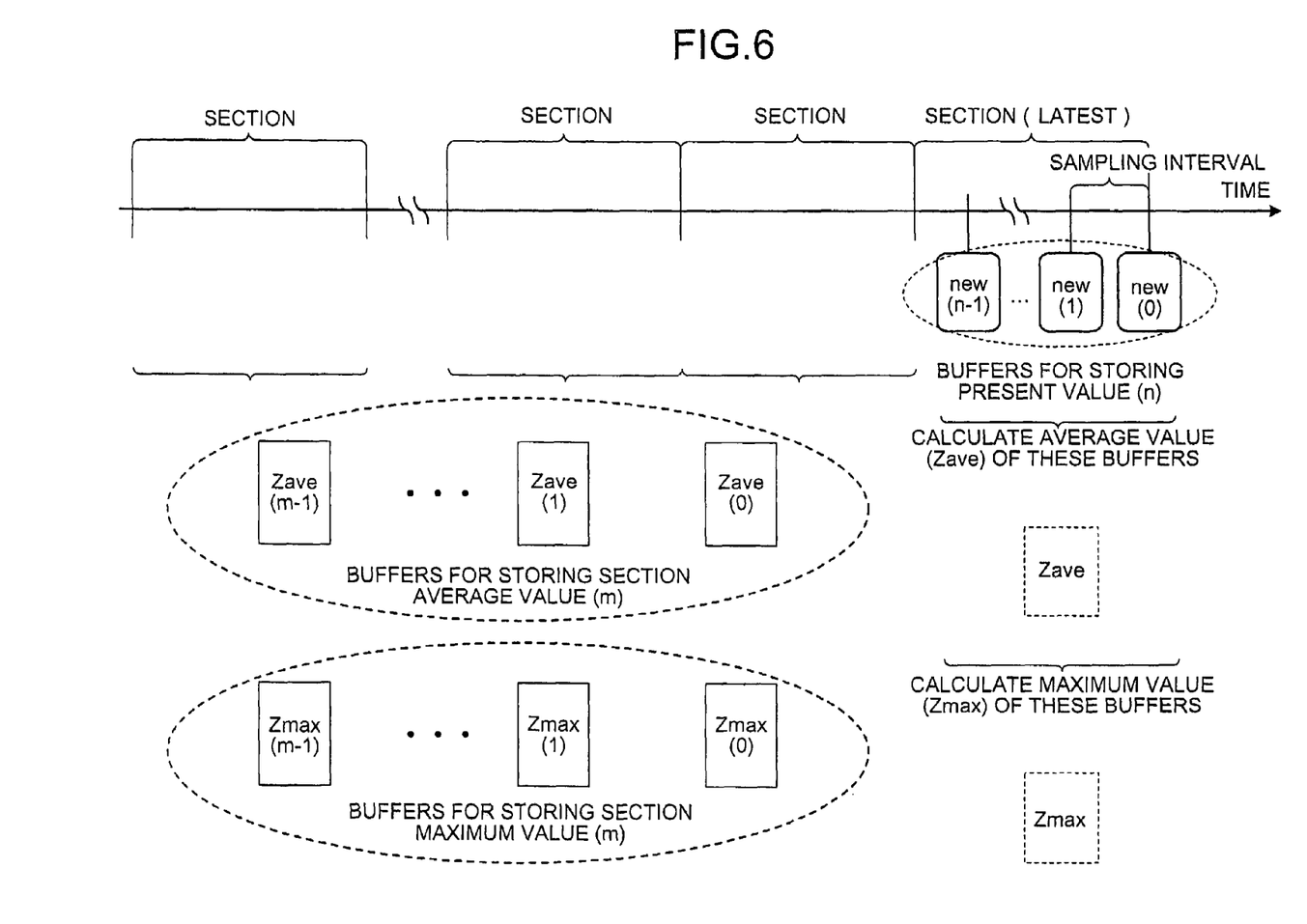
FIG. 6 is a schematic for illustrating buffers according to an embodiment of the present invention.

The storage control unit 15 stores the present value data received from the present-value-data acquiring unit 14 in buffers provided in the monitoring-data storing unit 21. The buffers provided in the monitoring-data storing unit 21 include the "present value buffers" and the "representative value buffers". Here, these buffers are explained with reference to FIG. 6. FIG. 6 is a diagram of the buffers according to the present embodiment.

The buffers shown in FIG. 6 are buffers for storing the respective values shown in FIG. 5. Buffers for storing present value data in the latest section (indicated by "black circles" in FIG. 5) are n buffers new(0) to new(n-1). Buffers for storing average values in the sections other than the latest section (indicated by "black squares" in FIG. 5) are m buffers Zave(0) to Zave(m-1). Buffers for storing maximum values in the sections (indicated by "black triangles" in FIG. 5) are m buffers Zmax(0) to Zmax(m-1).

As shown in FIG. 6, when the n buffers for storing present values and m×2 buffers for storing average values and maximum values in sections are used, a total number of buffers is represented as "n+2m". The total number of buffers can be set as a fixed value designated in advance or can be set as a variable value such that it is possible to use a storage area most efficiently.

The efficient usage of a storage area is equivalent to minimization of the total number of buffers. Thus, if a relation between "n" and "m" minimizing "n+2m" is found, it is possible to use the storage area most efficiently. In other words, since "n+2m" is minimized in the case of "n=2m" judging from a relation of arithmetic and geometrical means, a ratio of "n" and "m" only has to be set as "2:1".

For example, when a sampling interval is set to 1 second and a section length is set to 10 seconds, a value of n is 10. Thus, from the relation of "n=2m", it is possible to use the storage area most efficiently if a value of m is set to 5. Note that a total number of buffers in this case is twenty (10+5×2).

Incidentally, in storing present value data in the present value buffers ("buffers for storing present values" in FIG. 6) and the representative value buffers ("buffers for storing section average values" and "buffers for storing section maximum values" in FIG. 6), the storage control unit 15 performs processing for calculating section average values and section maximum values of the present value data and storing the section average values and the section maximum values in the representative value buffers. The storage control unit 15 also performs buffer shift processing for the representative value buffers. Next, these processings are explained in detail.

When present value data are stored in all the present value buffers (new(0) to new(n-1)), the storage control unit 15 calculates an average value (Zave) in the latest section by dividing a sum of the preset value buffers new(0) to new(n-1) by the total number (n) of the present value buffers. The storage control unit 15 also calculates a maximum value (Zmax) of the latest section by comparing the respective present value buffers new(0) to new(n-1).

Then, the storage control unit 15 deletes oldest data (Zave (m-1) and Zmax(m-1) in FIG. 6) of the representative buffers and performs buffer shift (e.g., shifts Zave(m-2) to Zave(m-1) and shifts Zave(m-3) to Zave(m-2)). Then, the storage control unit 15 stores the calculated average value (Zave) and the calculated maximum value (Zmax) of the latest section in Zave(0) and Zmax(0), respectively.

When the present value data is stored in all the present value buffers (new(0) to new(n-1)), the storage control unit 15 repeats the processing described above. Consequently, section average values and section maximum values, which are representative values of the sections, are sequentially stored in the buffers for the respective sections shown in FIG. 6. Note that, when there are free spaces in the present value buffers, acquired present value data are sequentially stored in the present value buffers and the representative value buffers are not updated. In addition, when the present value data is stored in all the present value buffers, the storage control unit 15 calculates representative values (an average value and a maximum value) of the latest section and stores the representative values in the buffer for storing representative values. Then, all the data stored in the present value buffers are deleted (all clear).

Note that, in the explanation of the present embodiment, plural buffers arranged in time series are used. However, it is also possible that buffers in a ring shape arranged cyclically are used and the storage control unit 15 performs storage control for the ring-shaped buffers. In addition, the storage control unit 15 may curtail present value data received from the present-value-data acquiring unit 14 and store the present value data in the buffers provided in the monitoring-data storing unit 21.

Referring back to FIG. 4, the timer control unit 16 is explained. The timer control unit 16 measures a sampling interval of present value data and instructs the present-value-data acquiring unit 14 to acquire the present value data. The present-value-data acquiring unit 14, which has received such an instruction, acquires present value data of respective monitoring objects.

The storing unit 20 is constituted by a memory like a random access memory (RAM). The storing unit 20 stores present value data and section representative value data according to an instruction of the monitoring-information provision processing unit 10 and provides the monitoring-information provision processing unit 10 with the stored data. In addition, the monitoring-data storing unit 21 includes the present value buffers and the representative value buffers that are explained with reference to FIG. 6.

Figure 7:
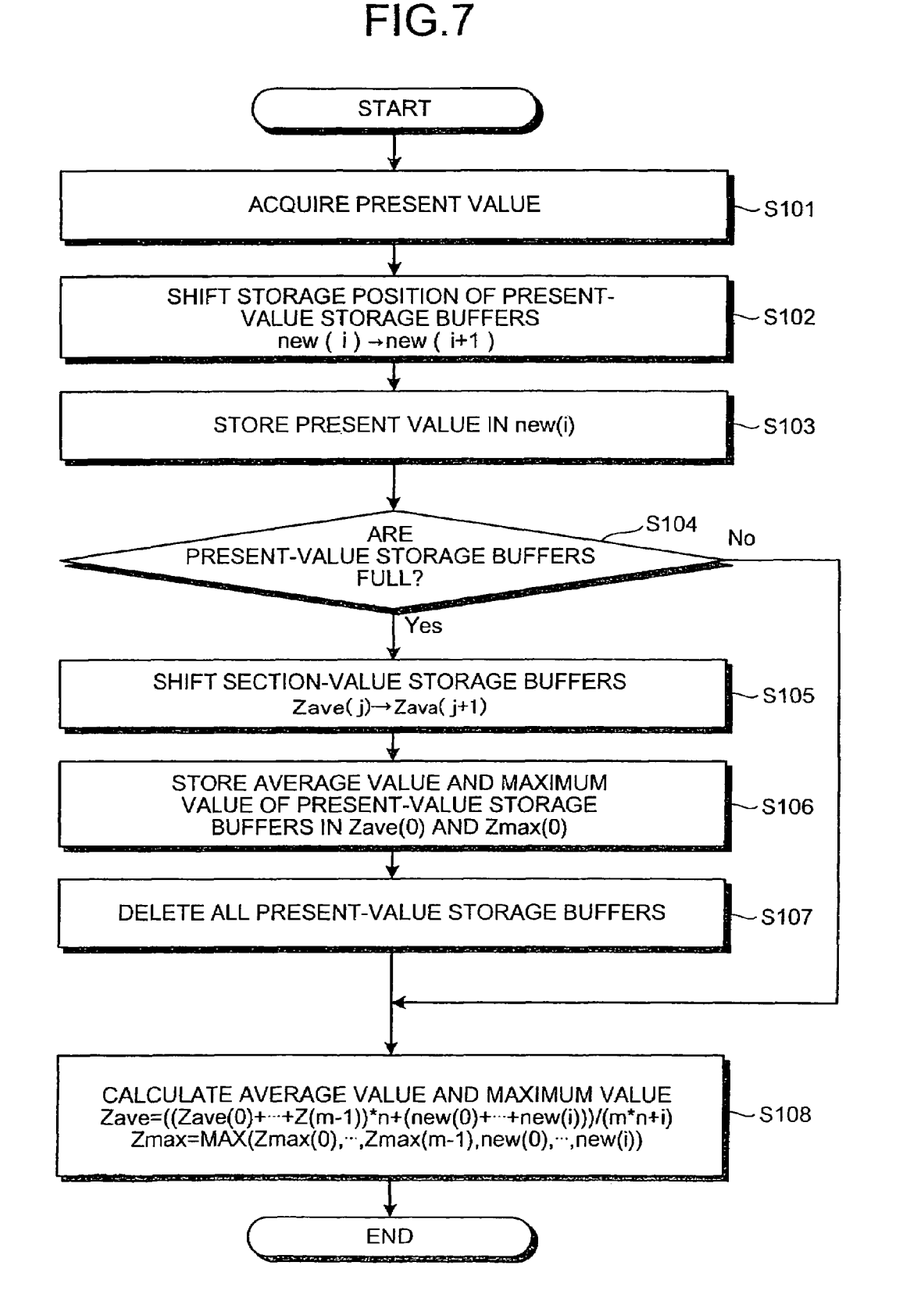
FIG. 7 is a flowchart of a processing procedure of a storage control unit.

FIG. 7 is a flowchart of the processing procedure of the storage control unit 15. As shown in the figure, when the storage control unit 15 acquires a present value from the present-value-data acquiring unit 14 (step S101), the storing control unit 15 shifts a storage position in the present value storage buffers (step S102) and stores the acquired present value in new(i) of the present value storage buffers (step S103). Here, "new(i)" indicates an "ith" buffer of the total n present value buffers.

Subsequently, the storage control unit 15 judges whether present values are stored in all the present value storage buffers (new(0) to new(n-1)) (step S104). Then, when there are free spaces in the present value storage buffers ("No" at step S104), the storage control unit 15 calculates an average value and a maximum value over a monitoring period based on the values (new(0) to new(i)) stored in the present value storage buffers and the section representative values (Zave(0) to Zave(m-1) and Zmax(0) to Zmax(m-1)) (step S108) and ends the processing. Note that "MAX(argument 1, argument 2, etc.) shown in the figure is a function that returns a maximum value specified by an argument.

On the other hand, when present values are stored in all the present value storage buffers ("Yes" at step S104), the storage control unit 15 shifts section value storage buffers to delete values of oldest section value storage buffers and empties the latest section value storage buffers (Zave(0) and Zmax(0)) (step S105). Then, the storage control unit 15 stores an average value and a maximum value of the present value buffers in Zave(0) and Zmax(0), respectively (step S106).

Subsequently, the storage control unit 15 deletes all the values in the present value storage buffers (all clear) (step S107), calculates an average value and a maximum value over the monitoring period (step S108), and ends the processing. Note that, in this case, a value of "i" is "0" and all values of the present value storage buffers (new(O) to new(i)) are "0". Thus, the storage control unit 15 calculates an average value and a maximum value in the monitoring period based only on the values of the section value storage buffers (Zave(0) to Zave(m-1) and Zmax(0) to Zmax(m-1)).

In the explanation of the monitoring-information provision processing, the n buffers for storing present values and m×2 buffers for storing average values and maximum values of sections are used. However, in the monitoring-information provision processing according to the present invention, it is possible to calculate an average value and a maximum value over a monitoring period even if n and m are one, respectively. In the following explanation, a procedure for calculating an average value and a maximum value over a monitoring period when there are one present value buffer and two representative value buffers (one buffer for average values and one buffer for maximum values) is explained.

Figure 8:
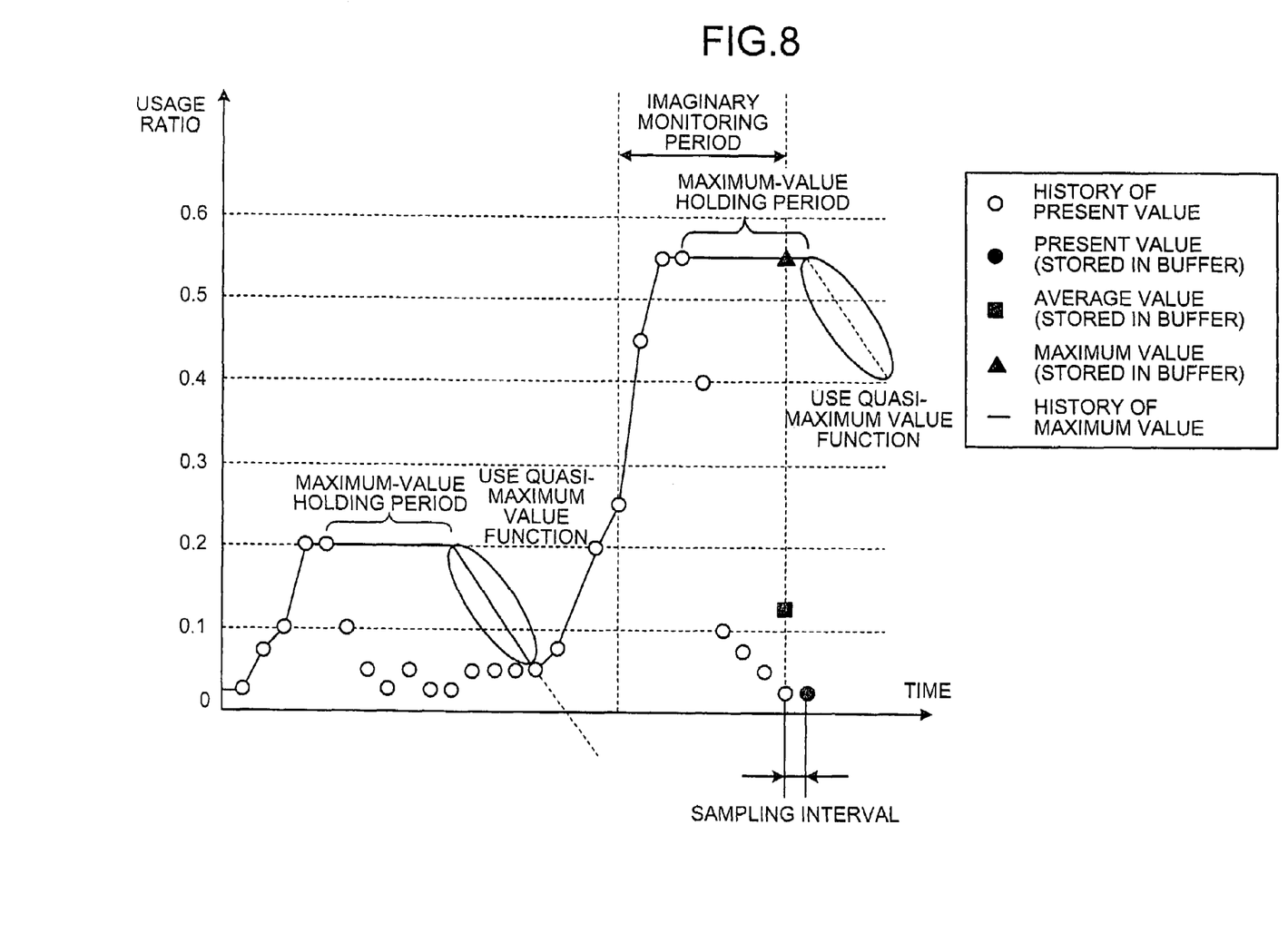
FIG. 8 is a graph for illustrating an outline of processing for calculating average values and maximum values using buffers with a minimum configuration.

FIG. 8 is a graph for illustrating an outline of processing for calculating average values and maximum values using buffers with a minimum configuration. As shown in the figure, in calculation processing using the buffers with a minimum configuration (one present value buffer and two representative value buffers), concepts of an "imaginary monitoring period" used for average value calculation and a "maximum value holding period" and a "quasi-maximum value function" used for maximum value calculation are introduced to calculate average values and maximum values.

The "imaginary monitoring period" represents an object period for calculating average values imaginarily. Conventionally, when there is one representative value buffer for storing average values (hereinafter referred to as "average value buffer"), if average values are calculated using this average value buffer and one present value buffer, the average values change less easily. For example, a present value buffer storing an average value acquired at a sampling interval of 1 second has only a one hundredth degree of influence compared with an average value buffer storing an average value over 100 seconds. Therefore, if a monitoring period is long, only an average value insensitive to a movement of present values can be calculated.

Figure 9:
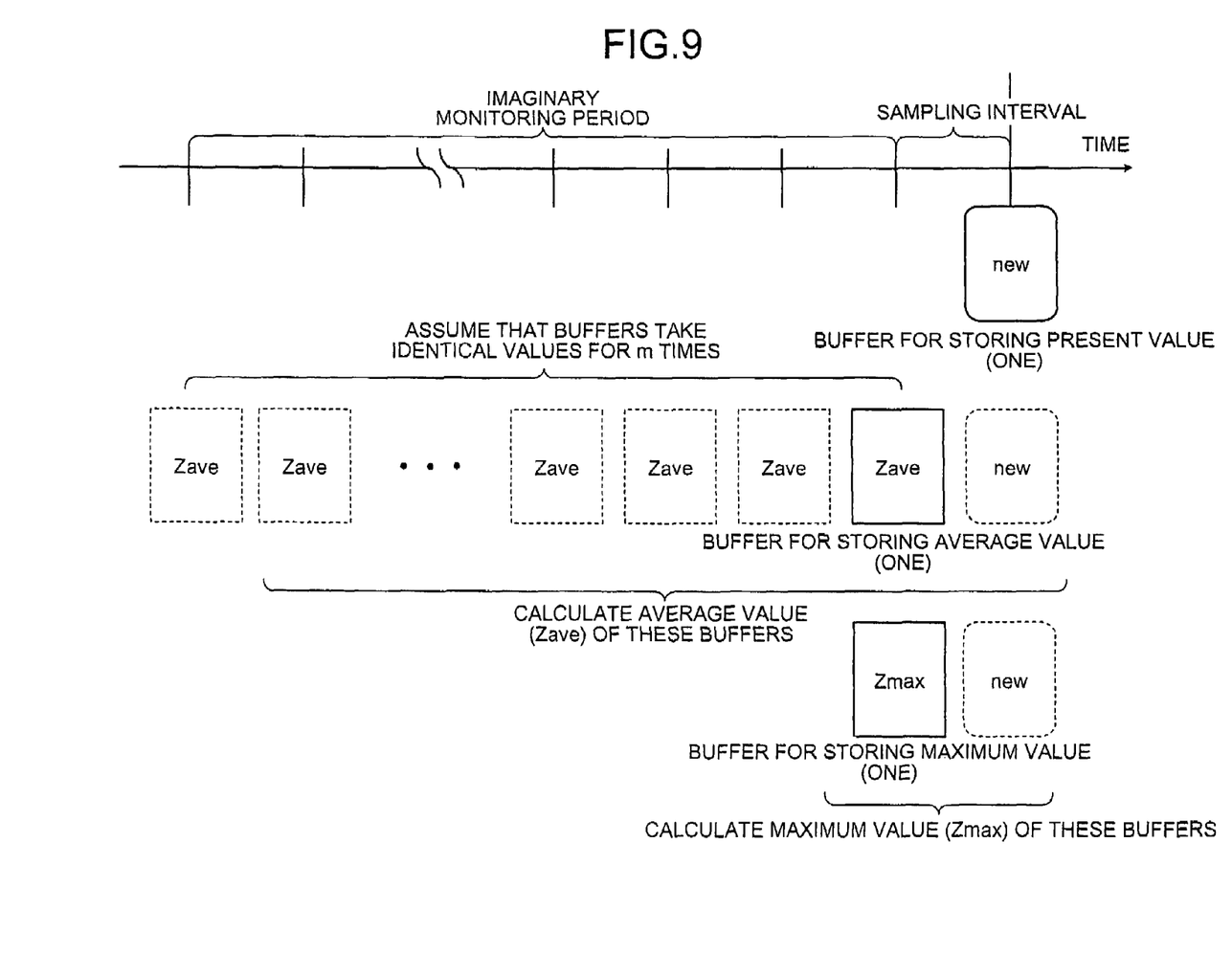
FIG. 9 is a schematic of an imaginary monitoring period and respective buffers.

Thus, in the monitoring-information provision processing according to the present embodiment, the problem is solved by introducing the concept of the "imaginary monitoring period" and reducing a degree of influence of the representative value buffers. Here, the imaginary monitoring period is explained with reference to FIG. 9. FIG. 9 is a schematic of an imaginary monitoring period and respective buffers.

As shown in the figure, it is assumed that an average value stored in one average value buffer is continuously calculated in sampling processing for m times. In this case, a period m times as long as a sampling interval is the "imaginary monitoring period". An oldest average value (Zave) is abandoned and a present value (new) is added. Then, a new average value is calculated from m-1 average values Zave and the one new average value. Specifically, a value calculated by an expression $((m-1) \times Zave + new)/m$ is stored in Zave as a new average value.

Consequently, when the monitoring period is long, it is possible to solve the problem of insensitivity of an average value to a movement of present values. Note that, since the "imaginary monitoring period" can be set as a period of an arbitrary length, it is possible to change the "imaginary monitoring period" according to needs of a user.

Referring back to FIG. 8, the "maximum value holding period" and the "quasi-maximum value function" are explained. The "maximum value holding period" represents a predetermined period in which a maximum value is held. The "quasi-maximum value function" represents a function for reducing a maximum value that is held exceeding the maximum value holding period. For example, when a sampling interval is 1 second, it is assumed that the maximum value holding period is set to 5 seconds and the quasi-maximum value function is set to $Zmax \times 0.5$.

In such a case, if a CPU usage ratio acquired in certain sampling processing is 0.8 (80%), Zmax keeps 0.8 for 5 seconds. Then, 6 seconds later, a value of Zmax is calculated as 0.4 (0.8×0.5) using the quasi-maximum value function. This value and a value of new acquired in 6 seconds are compared. If both values of new acquired 6 seconds and 7 seconds later are 0.3, 6 seconds and 7 seconds later, values of Zmax calculated using the quasi-maximum value function are 0.4 and 0.2, respectively. Thus, 7 seconds later, the value of new is larger than the value of Zmax 7. Zmax 7 seconds later is calculated as 0.3 by comparing 0.2 and 0.3.

Conventionally, when there is one representative value buffer for storing maximum values (hereinafter referred to as "maximum value buffer"), if a maximum value is calculated using this representative value buffer and one present value buffer, once the maximum value takes a value near an upper limit value, maximum values after that never change. This is called a problem of "fixation of a maximum value". In the monitoring-information provision processing according to the present embodiment, the concepts of the "maximum value holding period" and the "quasi-maximum value function" are introduced to solve the problem of fixation of a maximum value. Note that the "maximum value holding period" may be stored in the monitoring-data storing unit 21. However, a function including the "maximum value holding period" may be used as the "quasi-maximum value function".

The "maximum value holding period" and the "quasi-maximum value function" are used in this way, whereby it is possible to solve the problem of fixation of a maximum value. Note that the "maximum value holding period" can be set as a period of an arbitrary length and the "quasi-maximum value function" can be set as an arbitrary decreasing function. Thus, it is possible to change the "maximum value holding period" and the "quasi-maximum value function" according to needs of a user.

Figure 10:
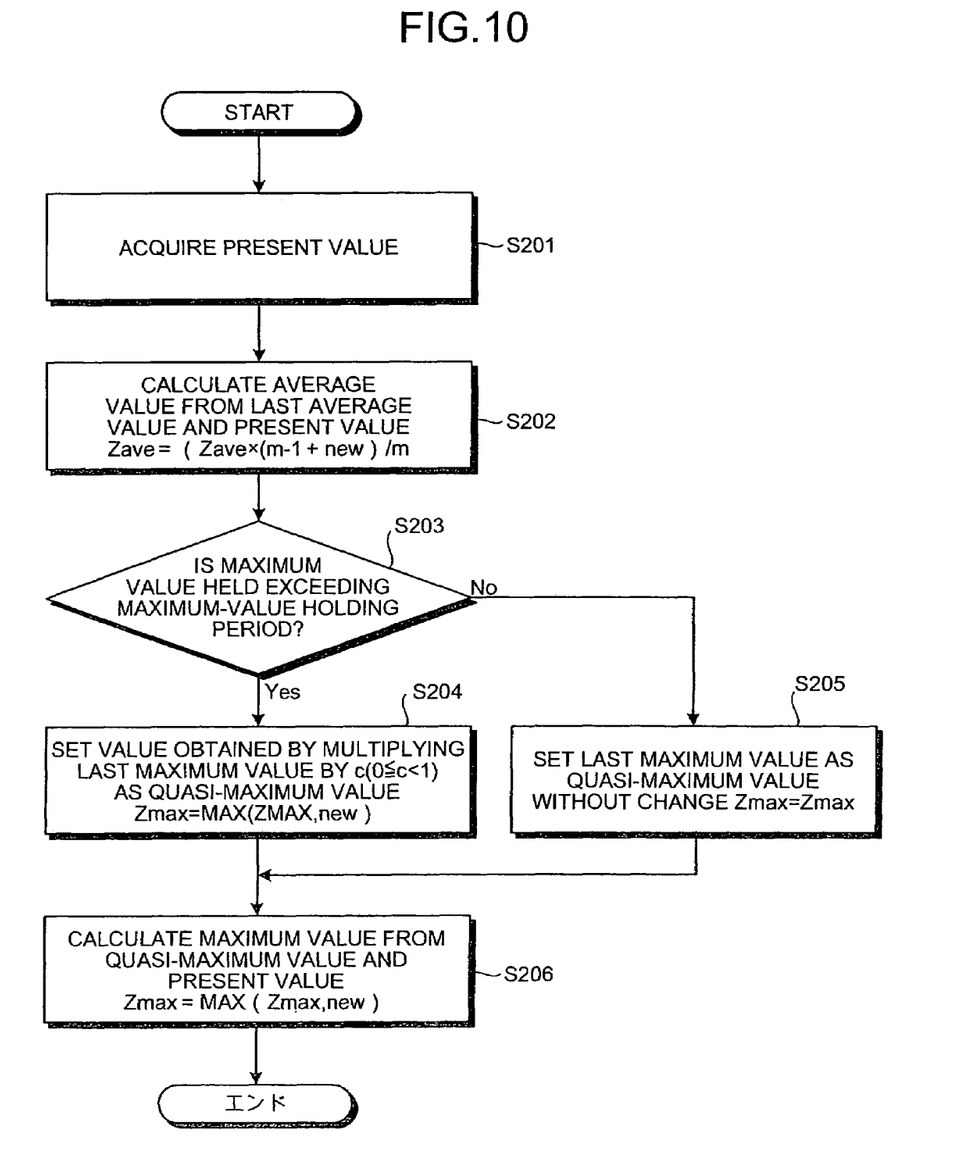
FIG. 10 is a flowchart of a processing procedure of the storage control unit in the case of buffers with a minimum configuration.

FIG. 10 is a flowchart of the processing procedure of the storage control unit 15 in the case of buffers with a minimum configuration. As shown in the figure, when the storage control unit 15 acquires a present value from the present-value-data acquiring unit 14 (step S201), the storing control unit 15 calculates a new average value (Zave) from an average value of the last time (Zave) and a present value (new) (step S202). Note that, an expression in this case is Zave=((m-1)×Zave+ new)/m as described above.

Subsequently, to calculate a maximum value, the storage control unit 15 judges whether a maximum value of the last time is held exceeding the maximum value holding period (step S203). If the maximum value of the last time is not held exceeding the maximum value holding period ("No" at step S203), the storage control unit 15 sets the maximum value of the last time as a quasi-maximum value without changing the maximum value (step S205). Then, the storage control unit 15 compares this quasi-maximum value and the present value to thereby calculate a larger one as a new maximum value (step S206) and ends the processing.

On the other hand, if the maximum value of the last time is held exceeding the maximum value holding period. ("Yes" at step S203), the storage control unit 15 sets a value obtained by multiplying the maximum value of the last time by c ($0 \leq c < 1$) as a quasi-maximum value (step S204). Then, the storage control unit 15 compares this quasi-maximum value and the present value to thereby calculate a larger one as a new maximum value (step S206) and ends the processing.

Even when present value buffers and representative value buffers have a minimum configuration (n=1 and m=1) in this way, in the monitoring-information provision processing according to the present embodiment, it is possible to provide an average value and a maximum value over the monitoring period by using the "imaginary monitoring period", the "maximum value holding period", and the "quasi-maximum function".

As described above, in the present embodiment, the present-value-data acquiring unit acquires present values representing operation states of monitoring object components at predetermined sampling intervals according to an instruction from the timer processing unit. The storage control unit performs storage control for present value buffers and representative value buffers provided in the monitoring-data storing unit to thereby store present values and representative values. When the provision-request receiving unit receives a monitoring information provision request from the terminal apparatus, the provision-data calculating unit, which has notified of the monitoring information provision request via the monitoring-information providing unit, calculates representative values of a monitoring period such as a maximum value and an average value. The monitoring-information providing unit creates a graph, which includes a result of such calculation, using the Markup language and transmits the result to the terminal apparatus that requests provision of monitoring information. Thus, it is possible to provide monitoring information sufficient for practical uses efficiently while controlling resource consumption involved in system monitoring.

Figure 11:
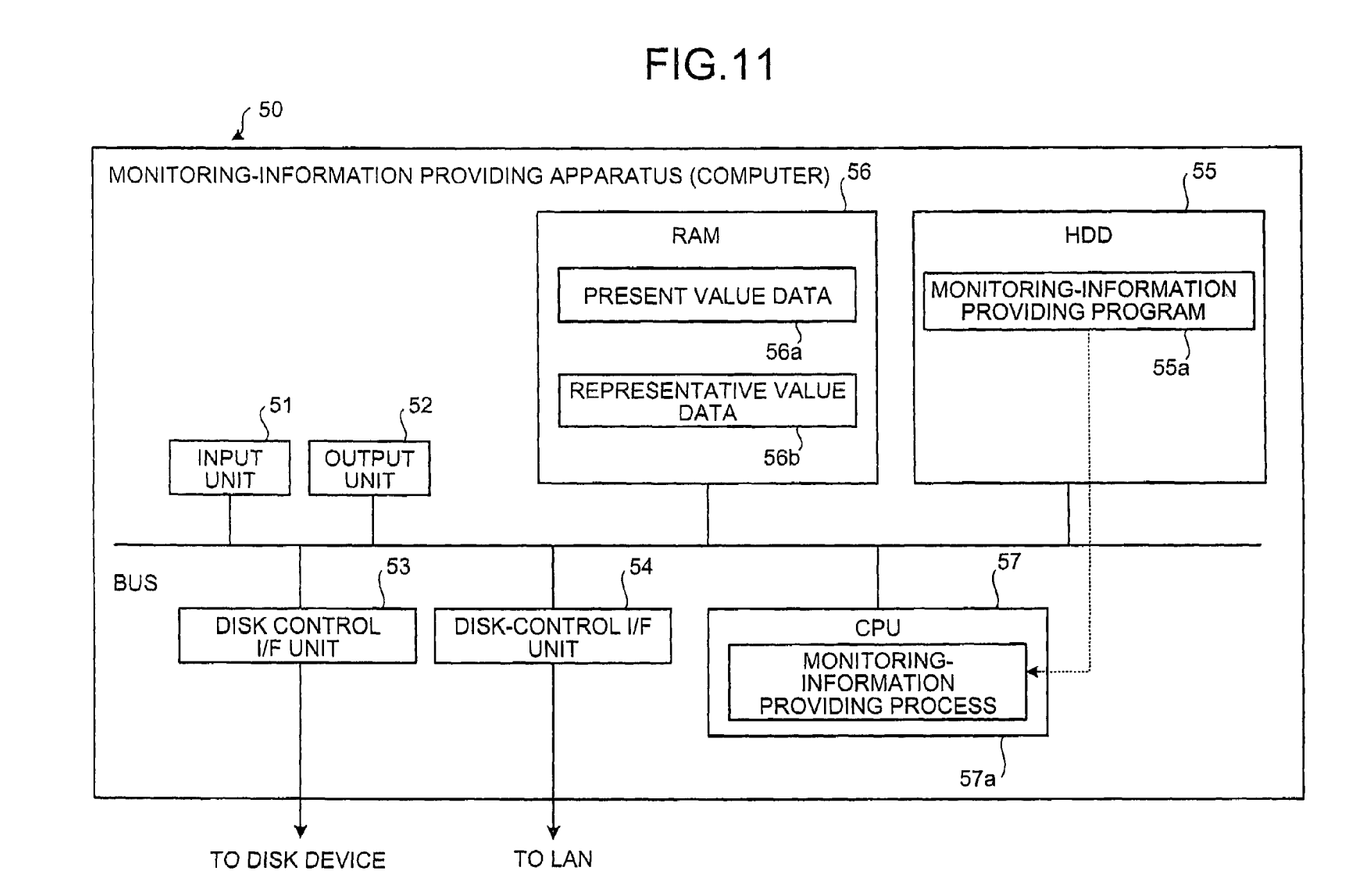
FIG. 11 is a block diagram of a computer that executes a monitoring-information providing program.

Incidentally, it is possible to realize the various kinds of processing explained in the embodiment by executing a program prepared in advance with a computer. Thus, in the following explanation, an example of a computer, which executes a monitoring-information providing program having the same function as the embodiment, is explained with reference to FIG. 11. FIG. 11 is a diagram of the computer that executes the monitoring-information providing program.

As shown in the figure, in a computer 50 serving as a monitoring-information providing apparatus, an output unit 52, a disk control I/F unit 53, a network I/F unit 54, a hard disk drive (HDD) 55, a RAM 56, and a central processing unit (CPU) 57 are connected by a bus 58. The input unit is a device for input like a keyboard and the output unit is a device for output like a display. The disk control I/F unit 53 is a device for disk control like a small computer system interface (SCSI). A disk device and a storage device, which are monitoring objects, are connected to the disk control I/F unit 53.

The network I/F unit 54 corresponds to the communication unit 2 shown in FIG. 4. An apparatus, which is a monitoring object of the computer 50, is connected to the network I/F unit 54 via a network such as a LAN. In addition, a monitoring terminal, which displays monitoring information provided by the computer 50, is also connected to the network I/F unit 54 in the same manner.

A monitoring-information providing program 55a is stored in the HDD 55 in advance. The CPU 57 reads out and executes the monitoring-information providing program 55a stored in the HDD 55, whereby the monitoring-information providing program 55a functions as a monitoring information providing process 57a as shown in FIG. 11. When the monitoring information providing process 57a functions, present value data 56a and representative value data 56b are stored on the RAM 56.

It is not always necessary to store the monitoring-information providing program 55a in the HDD 55 in advance. For example, it is also possible that a computer program is stored in a computer-readable recording medium or in a "portable physical medium" readable by the computer 50 like a flexible disk (FD), a CD-ROM, and a magneto-optical disk or "other computers (or servers)" or a transmission medium connected to the computer 50 via a public line, the Internet, a LAN, a WAN, or the like and the computer 50 reads out and executes the computer program.

According to the present invention, it is possible to provide monitoring information sufficient for a practical use efficiently while controlling resource consumption involved in system monitoring.

Furthermore, according to the present invention, it is possible to sequentially hold highly accurate section representative values while controlling resource consumption.

Moreover, according to the present invention, it is possible to provide an average value sufficient for a practical use efficiently while controlling resource consumption.

Furthermore, according to the present invention, it is possible to provide an average value sufficient for a practical use with a minimum buffer configuration.

Moreover, according to the present invention, it is possible to provide a maximum value sufficient for a practical use efficiently while controlling resource consumption.

Furthermore, according to the present invention, it is possible to solve a problem of fixation of a maximum value.

Moreover, according to the present invention, it is possible to provide a maximum value close to a transition of an actual maximum value while solving the problem of fixation of a maximum value.

Furthermore, according to the present invention, it is possible to provide monitoring information sufficient for a practical use while controlling resource consumption with a simple configuration.

Moreover, according to the present invention, it is possible to control resource consumption efficiently.

Furthermore, according to the present invention, it is possible to provide monitoring information for plural monitoring objects efficiently.

Moreover, according to the present invention, it is possible to control resource consumption of a monitoring terminal in a transmission destination efficiently.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A monitoring-information providing apparatus that acquires a present value representing an operation state of a monitoring object for every predetermined monitoring interval to generate monitoring information for a predetermined monitoring period, and provides a monitoring terminal with the monitoring information generated, the monitoring-information providing apparatus comprising:
   a storing unit including
      a predetermined number of present value buffers that store the present value in time series; and
      a predetermined number of section-representative-value buffers that store a section representative value calculated based on the present value belonging to a predetermined section included in the monitoring period in time series;
   a storage control unit that, when the present value is acquired, performs a control for storing data in the present value buffers and the section-representative-value buffers; and
   a calculating unit that calculates a period representative value of the monitoring period based on the present value and the section representative value stored in the storing unit.

2. The monitoring information provision apparatus according to claim 1, further comprising a monitoring-information generating unit that generates the monitoring information including at least one of the data stored in the storing unit and the period representative value calculated by the calculating unit, using a Markup language.

3. The monitoring-information providing apparatus according to claim 1, wherein, if the present value is stored in all the present value buffers provided in the storing unit, the storage control unit calculates the section representative value of a latest section based on the present value, and stores the section representative value of the latest section in the section-representative-value buffers.

4. The monitoring-information providing apparatus according to claim 1, wherein
   the section representative value stored in the storing unit is a section average value, and
   the representative value calculated by the calculating unit is a period average value.

5. The monitoring-information providing apparatus according to claim 4, wherein,
   when there is one section-representative-value buffer, the storage control unit calculates the period average value assuming that a value of the section-representative-value buffer is taken in all the sections included in the monitoring section, and stores the period average value calculated in the section-representative-value buffer, and
   the calculating unit sets the value of the section-representative-value buffer as the period representative value as it is.

6. The monitoring-information providing apparatus according to claim 1, wherein
   the section representative value stored in the storing unit is a section maximum value, and
   the period representative value calculated by the calculating unit is a period maximum value.

7. The monitoring-information providing apparatus according to claim 6, wherein
   when there is one section-representative-value buffer for storing the section maximum value, the storage control unit holds a value of the section-representative-value buffer until a maximum value holding period that represents a period for holding a value of the section-representative-value buffer expires, and
   when the present value is acquired, the storage control unit stores a new section representative value in the section-representative-value buffer by comparing the value of the section-representative-value buffer with the value of the present value buffer.

8. The monitoring-information providing apparatus according to claim 7, wherein the storage control unit decreases a value of the section-representative-value buffer every time the present value is acquired, and stores a new section representative value in the section-representative-value buffer by comparing the value of the section-representative-value buffer decreased with the value of the present value buffer.

9. The monitoring-information providing apparatus according to claim 1, wherein a number of the sections included in the monitoring period is set in advance.

10. The monitoring-information providing apparatus according to claim 1, wherein a number of the sections included in the monitoring period is changed in such a manner that number of buffers provided in the storing unit is minimized based on the monitoring period and the monitoring interval.

11. The monitoring-information providing apparatus according to claim 1, wherein the storing unit has the present value buffer and the section-representative-value buffer for each monitoring object.

12. The monitoring-information providing apparatus according to claim 2, wherein the monitoring-information generating unit generates the monitoring information graphically represented using the Markup language.

13. A monitoring-information providing method of acquiring a present value representing an operation state of a monitoring object for every predetermined monitoring interval to generate monitoring information for a predetermined monitoring period, and providing a monitoring terminal with the monitoring information generated, the monitoring-information providing method comprising:
   storing including
      storing the present value in a predetermined number of present value buffers in time series; and
      storing a section representative value calculated based on the present value belonging to a predetermined section included in the monitoring period in a predetermined number of section-representative-value buffers in time series;
   performing, when the present value is acquired, a control for storing data in the present value buffers and the section-representative-value buffers; and
   calculating a period representative value of the monitoring period based on the present value and the section representative value stored at the storing.

14. The monitoring information provision method according to claim 13, further comprising generating the monitoring information including at least one of the data stored at the storing and the period representative value calculated at the calculating, using a Markup language.

15. The monitoring-information providing method according to claim 13, wherein, if the present value is stored in all the present value buffers provided at the storing, the performing includes calculating the section representative value of a latest section based on the present value; and storing the section representative value of the latest section in the section-representative-value buffers.

16. The monitoring-information providing method according to claim 13, wherein the section representative value stored at the storing is a section average value, and the representative value calculated at the calculating is a period average value.

17. A computer-readable recording medium that stores a monitoring-information providing program for acquiring a present value representing an operation state of a monitoring object for every predetermined monitoring interval to generate monitoring information for a predetermined monitoring period, and providing a monitoring terminal with the monitoring information generated, wherein the monitoring-information providing program makes a computer execute storing including storing the present value in a predetermined number of present value buffers in time series; and storing a section representative value calculated based on the present value belonging to a predetermined section included in the monitoring period in a predetermined number of section-representative-value buffers in time series;

performing, when the present value is acquired, a control for storing data in the present value buffers and the section-representative-value buffers; and calculating a period representative value of the monitoring period based on the present value and the section representative value stored at the storing.

18. The computer-readable recording medium according to claim 17, wherein the monitoring-information providing program further makes the computer execute generating the monitoring information including at least one of the data stored at the storing and the period representative value calculated at the calculating, using a Markup language.

19. The computer-readable recording medium according to claim 17, wherein, if the present value is stored in all the present value buffers provided at the storing, the performing includes calculating the section representative value of a latest section based on the present value; and storing the section representative value of the latest section in the section-representative-value buffers.

20. The computer-readable recording medium according to claim 17, wherein the section representative value stored at the storing is a section average value, and the representative value calculated at the calculating is a period average value.

* * * * *